March 1, 1960 J. D. BURKE 2,927,203

CONTROL MEMBER FOR SIMULTANEOUS ACTUATION OF MULTI-BAND TUNER AND CONTROL ELEMENT

Filed July 27, 1956 3 Sheets-Sheet 1

John D. Burke,
INVENTOR

BY Hall & Houghton

ATTORNEY

John D. Burke,
INVENTOR
BY Hall & Houghton
ATTORNEY

March 1, 1960 J. D. BURKE 2,927,203
CONTROL MEMBER FOR SIMULTANEOUS ACTUATION
OF MULTI-BAND TUNER AND CONTROL ELEMENT
Filed July 27, 1956 3 Sheets-Sheet 3

John D Burke,
INVENTOR

BY Hall + Houghton
ATTORNEY

United States Patent Office 2,927,203

Patented Mar. 1, 1960

2,927,203

CONTROL MEMBER FOR SIMULTANEOUS ACTUATION OF MULTI-BAND TUNER AND CONTROL ELEMENT

John Donald Burke, Hornchurch, England

Application July 27, 1956, Serial No. 600,462

Claims priority, application Great Britain September 5, 1955

2 Claims. (Cl. 250—20)

This invention relates to radio receivers both amplitude modulated and frequency modulated, television receivers, and combinations of television, radio and/or phonograph.

It could fairly be stated that the object of this invention is to revolutionize the design of radio and/or television receivers. The invention calls for the discarding of many orthodox components, such as the tuning condenser gang, the wave-band switch, the coil pack, the fine tuner and the turret-tuner for television, and other individually operated switches and controls.

In place thereof the invention offers a new method and new means whereby radio receivers of many new types may be manufactured, having advantages as to simplicity in use, greater service to the user, lowered cost in manufacture, and lower cost to the consumer.

The invention also takes advantage of developments such as the transistor, printed circuit techniques, recent improvement in permeability tuning materials, and so-called automation.

Embodiments of the invention will now be described in greater detail by way of example and with reference to the accompanying drawings of which—

Figures 3 and 4 also show forms of control section, and forms of circuit control element.

Figure 1:
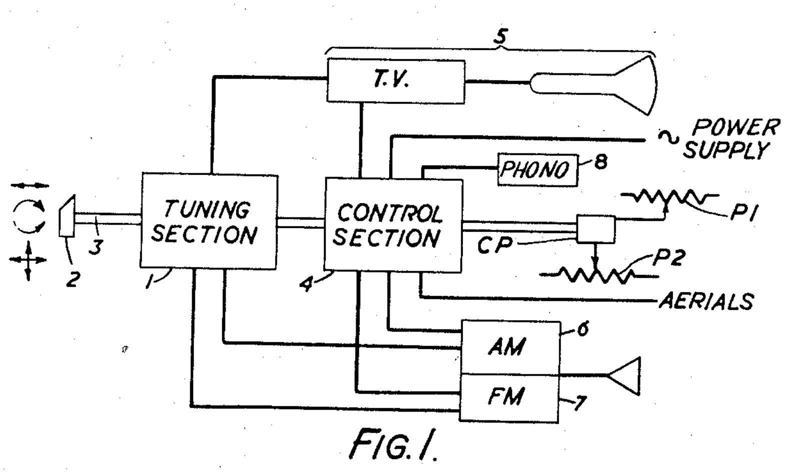
Figure 1 shows in block schematic form a receiver according to the invention.

Figure 1 illustrates in block schematic form the basic principle of the invention. That figure shows a combined radiophonograph-television receiver in which the sound radio and television parts have a common tuning section 1 operated by a single knob 2 fixed to a shaft 3. The shaft 3 also operates a section 4 which consists of a functional control section and although shown in Figure 1 as an entity separate from the tuning section 1 it may in fact form part of the latter. The shaft 3 further operates at least one circuit control element through coupling CP. Two such elements $P_1$ and $P_2$ are shown, operable by different-direction movement.

The section 1 comprises a plurality of tuning circuits sufficient to tune the receiver over a frequency range extending from the ordinary long wave length band to the AM short wave band, and over the VHF range of frequency modulated transmissions. The section 1 also tunes over television transmission bands. Control section 4 is synchronized with the tuning section and brings into operation at the appropriate time either a television section 5 of the receiver together with the required AM or FM sound portions, a sound-only section having a portion 6 for the reception of amplitude modulated transmissions and a portion 7 for the reception of frequency modulated transmissions or a phonograph 8. The sections are brought into operation by the application of power and the completion of connections from the tuning section. Thus, when the tuning section 1 is operating in the broadcast band (550–1600 kc./s.) the control section 4 has energized the section 6 and has selected such circuits as are necessary for the reception of amplitude modulated transmissions. If now it is desired to receive a frequency modulated VHF transmission operation of the tuning section 1 to the appropriate frequency also sets the control section 4 to a position in which the portion 6 is de-energized or such circuits thereof no longer required and in which the portion 7 or those circuits needed to receive the frequency modulated transmissions are energized and connected to the tuning unit.

Control section 4 may also determine the use made of such circuit control elements as $P_1$ and $P_2$. For example such a potentiometer as $P_1$ could be volume control at all times, while $P_2$ be contrast control for television but used as tone control for sound-only reception and/or Phono operation.

Operation of the tuning section to a television channel brings the television portion 5 of the receiver into operation and switches off such other parts of the receiver as are no longer required. Similarly, movement of the knob 2 to a position marked Phono brings into operation amplifier circuits, a turntable and any other circuit or components required for the use of the phonograph 8.

Figure 2:
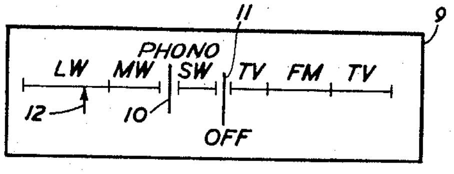
Figure 2 shows a tuning dial for the receiver of Figure 1.

The operating unit is of course provided with a dial one form of which is illustrated in Figure 2. The dial 9 covers the entire frequency range of the tuning section and has positions for other facilities provided by the control section 4, for instance, there is a position 10 marked Phono and another position 11 marked "Off" in which the receiver is entirely de-energized.

Although only one "Off" position is shown in Figure 2, there may be several such positions so that excessive movement of the knob 2 before an "Off" position is reached is avoided.

The shaft 3 is coupled to a pointer 12 which traverses the dial as the knob is rotated. Provision for vernier or fast action operation or choice of both can be made.

The shaft 3 may also be coupled to a "push button" control device which enables a pre-selected program to be tuned automatically. Operation of a particular button of the control device causes, in any of the well known ways, rotation of the shaft into a position required for the program selected, or movement to Phono, Off or other position.

It will be appreciated that many other facilities may be provided by the control section 4. If the receiver incorporates tape recording and reproducing equipment and/or if the receiver incorporates an intercom facility the section 4 controls this equipment also. The section 4 would normally also control the connection to the receiver of an aerial appropriate to the transmission being received. Further, the section 4 may control the intensity of illumination in a room containing a receiver so that when a television program is received the intensity is automatically adjusted to a required level.

Figure 1 is given by way of explanation only. It will be understood greater economy of components and circuits can be effected since components and circuits may be common to more than one part of a receiver. Thus the amplitude modulation and frequency modulation portions 6 and 7 shown above may be detector stages only feeding a common audio amplifier.

The shaft 3 may be operated remotely by suitable control mechanism. Alternatively the operating unit may be arranged for remote use separate from the rest of the receiver to which it is connected by appropriate leads.

The shaft 3 is capable of several forms of motion of which one is used to set the tuning section 1 to the required frequency and automatically adjust the control section so that the appropriate circuits and/or components are brought into use and other motions of the shaft are used for operating such controls as volume and/or contrast and/or brilliance.

The tuning section 1 tunes resonant circuits by any of the following known principles of tuning, namely, variation of the effective length of an inductance, variation of an inductance by the introduction of an iron dust core or core of other magnetic material into its field, variation of an inductance by the introduction of a core of brass or similar non-magnetic metal of high conductivity into its field, variation of capacitance, variation of the distributed capacity of an inductance, and variation of the reactance reflected into a circuit by a vacuum tube or other component. Within the range of the tuning section tuning is accomplished by one or more of the known principles in different portions of the range.

Figure 3:
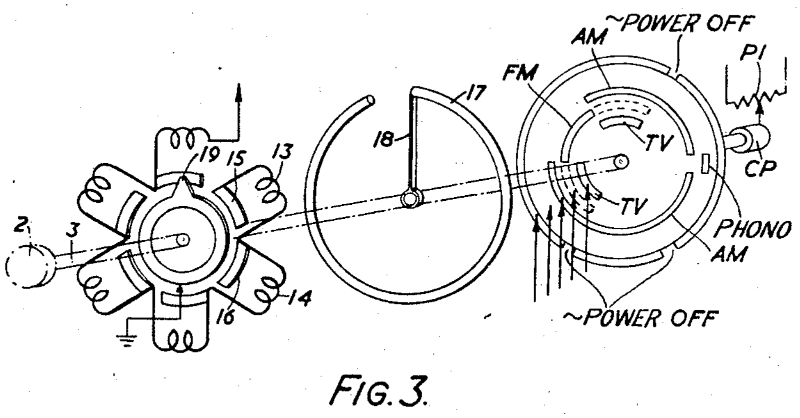
Figures 3, 4, 5, 6 and 7 show diagrammatically various forms of tuning section

Figure 3 shows in diagrammatic form an embodiment in which rotary motion is used for tuning including station selection and band or channel selection and for operation of the control section while longitudinal and/or axial movement is used for operation of circuit control element or elements.

The tuning section is shown as a set of coils illustrative of several such sets, and as a single core, and as a single assembly with essential contact, contact segments and related elements and connections. It will be understood that the tuning section will comprise a number of such assemblies.

The coils 13, 14 . . . comprise a tapped inductance, each tap of which starting from the bottom but not including the top is brought to a contact segment 15, 16 . . . the arcuate length of which is determined by the arcuate length of the coil to the electrical bottom of which it is connected.

The coils are arranged around the circumference of a circle and may be mounted on a coil former (not shown) which is common to all the coils and the axis of which forms a helix. Into this coil former and therefore into and through the coils a core 17 which is also helical in form and of relative proportions to the coil former may be turned up to a maximum of one complete turn. The supporting arm 18 fastened to the shaft 3 would rotate in a single plane but for the action of core 17 threading into the coil former and the coils. The arm 18 is made flexible to accommodate the core's screw-type motion, but is stiff in the direction of rotation to assure coordinate tuning action as the shaft is turned.

Alternatively, a helical wire which may be a conductor or a non-conductor is used to provide a trolley along which the core 17 slides. However, since there is only a single complete rotation of the shaft 3 and the core 17 does not need to fit tightly in the coil former and the coil former is not essential and core 17 may tune some coils simply by being brought near to them, in most applications a supporting arm 18 as described above will serve.

A rotatable contact 19 is grounded directly or is grounded in terms of radio frequency by means of a sliding contact contacting the ring to which it is joined. Rotatable contact 19 rotates, of course, in a single plane and is always in contact with at least one contacting segment 15, 16. . . . Thus, there are no undesirable breaks in reception and the receiver is always tuning one or another band of frequencies. Where desired, arrangements can be made for muting of audio and the suppression of video should the ends of tuning bands or the junction of segments 15, 16 . . . produce undesired signals or noise. Such muting could be provided by the control section, as also could suppression of video be provided.

Considering now the core 17, it will be seen that the core may be arranged to enter the coils 13, 14 . . . at the "electrical bottom" or at the "electrical top." The tuning action would be different in the following manner:

If a dust core is used, and if the core enters at the bottom, at the moment of entry the total inductance would comprise all of the coils in series under air conditions. Now the dust core would enter and increase the inductance of the bottom coil 13, thus tuning this lowest frequency band in a downward direction. Arriving at coil 14 simultaneously with contact 19 reaching segment 16, the coil 14 now becomes the lowest frequency coil and it is subject to being tuned as was coil 13 in a downward direction. Similarly throughout the whole rotation.

It will be noted that core 17 utilizes in each case above only that portion of its whole length approximately equivalent to the arcuate length of the coil being tuned. Thus, such an application can use a dust core of length considerably less than the whole circle but requiring extension of the supporting arm to replace the unused portion of core 17.

On the contrary, if a dust core is used for tuning starting with entry at the "top," i.e. the position of highest frequency the inductance at the moment of entry would comprise only the top coil under air core conditions, and thereby the frequency would then be at maximum. Fig. 3 shows the contact 19 on the "top" coil. As the core moves in, the frequency falls gradually until the contact 19 leaves the top coil's contact segment and the core is about to enter the second coil from the top. Now the frequency would fall by an amount determined by the second coil's inductance under air core conditions. Tuning thereafter would again reduce frequency within the band or channel. In this instance there could be use for a core 17 whose entire circular form comprised magnetic dust.

As is well known, a combination of magnetic and nonmagnetic cores can be used for various purposes, one of which is to extend the tuning range for a given motion.

Figure 7:
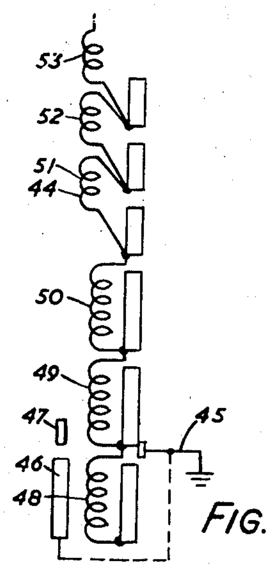
Figure 8:
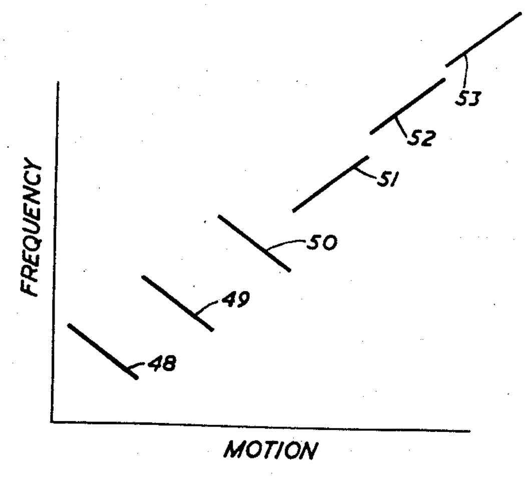
Figure 8 illustrates graphically the tuning characteristic of the embodiment of Figure 7.

Figure 7 shows a tapped inductance with a tuning characteristic shown in Figure 8 where some bands are tuned up in frequency and others down. That form will be discussed later. It shows a modification applicable to the embodiment of Figure 3 as well as other tapped inductance embodiments. The basic principle rests on the relative placement of cores and coils, and this applies to embodiments involving individual coils as well as to tapped inductances.

The coils of Figure 3 tunable by such a core as core 17 may be connected for individual selection by joining one end of each of the coils and connecting the other ends to the relative segments so that in turn the coils are selected and tuned. In that case it might be preferable to connect the contact 19 to a grid or plate or use similarly otherwise.

As stated before, the invention includes a tuning section within whose range tuning is accomplished by one or more of the known principles in different portions of the range. In relation to the embodiment of Figure 3 it will be seen that various factors will play a part in the tuning action, and some factors of little importance at lower frequencies will become dominant at the higher. In particular the variation of effective length of an inductance will have to be considered, and the various capacities including that of the contacting segments become important. The invention, of course, permits the well known uses of series or parallel capacitors and/or coils in relation to design needs.

Considering now the control section of Figure 3, it will be seen that in synchronism with the tuning of wavebands related circuits and/or components are energized. The drawing is schematic and indicates only a making of contact for facilities such as AM, FM, TV, Phono, and Power. Three "Off" positions are shown. Such a control section could comprise one or more wafers attached to shaft 3 and rotating each in a single plane. Alternatively a drum type commutator could be used. By means of constant tension switching the user could be spared any clicks or thumps. But, for the "Off" positions it may be well to include an indexing mechanism for accentuating the feeling of switch action and/or some form of momentary drag to retain the shaft 3 in the "Off" position.

Control section 4 may function through relays in the more elaborate applications.

The shaft 3 is also capable of longitudinal movement which is not transmitted to the rotatable contact 19 nor to the core and supporting arm 18. Such longitudinal movement is transmitted through coupling CP to potentiometer $P_1$ used, for example, as a volume control. Alternatively the longitudinal and/or other movement results in bodily movement of the assembly. In this case the bodily movement is used to operate circuit control element or elements.

Figure 4:
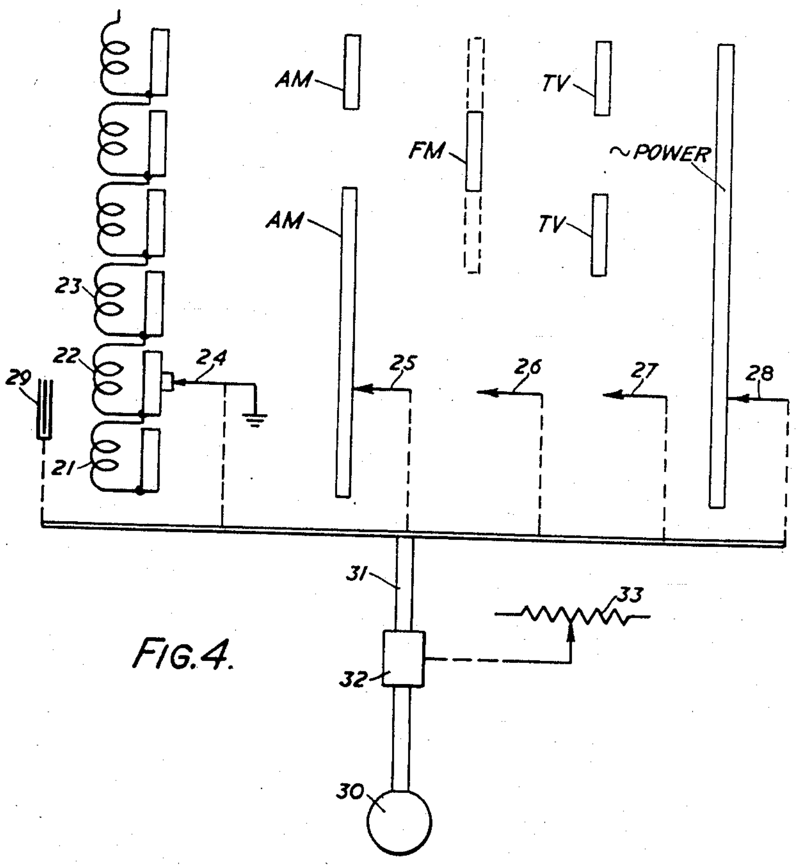

An alternative form of tuning section and control section are illustrated in Figure 4. In this figure linear movement replaces rotary movement of the embodiment in Figure 3. Tuning coils 21, 22, 23 . . . are arranged in line each with a contact strip traversed by moving contact 24. Coupled for movement with the contact 24 are other moving contacts 25, 26, 27 and 28 which move over contact strips as shown to provide the same functions as the rotary wafer and cooperating contacts shown in Figure 3, and in each case these represent the control section 4 of Figure 1.

Tuning within the frequency range of a coil is by means of a movable core 29 shown coupled for movement with the contacts 24, . . . 28. Operation of the embodiment of Figure 4 is by means of a knob 30 which is pulled in or out as required. The tuning scale may be engraved on a shaft 31 connected to knob 30 which shaft is the control member of the operating unit. Alternatively, a dial such as that in Figure 2 could be used, the pointer 12 being coupled to the shaft. Figure 4 also shows a coupling, represented diagrammatically by the block 32, inserted into the shaft 31. The coupling is responsive to rotary motion of shaft 31 but does not respond to the longitudinal movement thereof necessary for the operation of the tuning section and the control section. Rotation of the shaft 31 is transmitted through the coupling and is used to operate a potentiometer 33 acting as a volume control or other control.

In some countries the sound portions of television programs are frequency modulated, whereas in others, the United Kingdom in particular, the sound with television is amplitude modulated. The drawings show in full lines provision of United Kingdom transmissions, and the dotted lines on the control section in Figures 3 and 4 indicate a modification of countries using FM sound with television.

The embodiment of Figure 4 has particular significance in relation to receivers of two general types: Automobile receivers and portable receivers. For automobile receivers it is desirable to extend the present tuning range of such receivers to include both the FM band and the TV bands. By this invention both objectives can be realized with little or no increase in cost, for the same tuning tubes and most of the same components are used for all bands. I have included the proposal that TV bands be included in sound-only receivers, not only for automobile and portable receivers but for other types for the reason that a great deal of pleasure can be derived from just hearing the sound portions of TV transmissions, and this will be appreciated by people unable, for various reasons, to see the video portion.

The embodiment of Figure 4 may be used to provide automobile receivers using an operating knob and shaft similar to the choke rod on a car, and this rod could also have the dial engraved on it. Considering space limitations this may be a desirable application.

For portable AM and/or FM radio and/or television receivers the shaft 31 could form an aerial rod as well arranged so that its effective length varies as the frequency tuned is changed. It might be desirable to fit such a rod and the operating unit it controls so that the rod emerges at about a 45 degree angle from the horizontal so as to serve as a dipole for either vertically or horizontally polarized signals, and, in cooperation with loop and/or ferroxcube as an aid to AM high frequency signals. A typical operation could be: Pulling out the rod turns set "On." Further pulling and pushing tunes for band and station, and operates the control section to energize appropriate circuits and/or components. Rotation of the rod operates a control, such as the volume control. The whole operating unit could be arranged for further movement of an axial type by which an additional control or controls would be operated.

Figure 5:
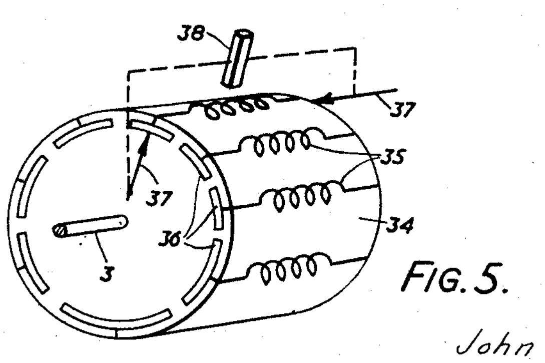

A further form of tuning section is shown in Figure 5 in which the tuning section takes the form of a drum-like structure 34 having coils 35 connected between the segments 36 on the flat faces of the drum. The segments cooperate with contacts 37 and tuning is achieved by effecting relative movement between the segments 36 and the contacts 37. Variation of inductance of any coil while connected between the contacts 37 is effected primarily by means of a mass 38 of magnetic material movement of which relative to the connected coil occurs during the period of action of the coil. The tuning of a coil during its period of action may alternatively be effected by means of capacitors variation of whose capacitance is effected by the relative movement between the segments and the contacts. The mass 38 may be entirely of magnetic material as just described or it may consist of a combination of parts some of which are of magnetic material while others are of non-magnetic material. The mass may be of a trough like form into and through which the coils pass.

The embodiment shown in Figure 5 may have coils formed by the well-known printed circuit techniques. It will be observed that the segments 36 are of differing lengths depending upon the amount of band-spread given to particular frequency bands. The step and continuous tuning principle of the invention is further enhanced by the possibility of compressing less desired bands and spreading others. This result depends on the size and shape and characteristics of the various coils and cores and other tuning elements.

The embodiment shown in Figure 5 may be modified by "opening out" the drum structure and arranging the coils in a single plane. Movement between the contacts 37 and the segments 36 is thus linear.

With the embodiments described above where the coils are not part of a tapped inductance portions of the tuning range may be placed at any required point on the dial. On the other hand employment of tapped inductances necessitates the sequential placement of the frequency bands.

Figure 6:
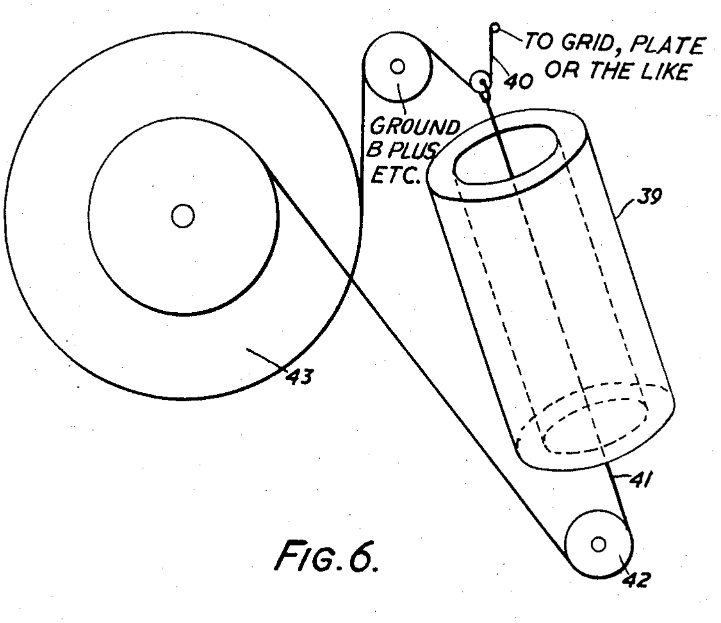

Figure 6 illustrates an embodiment which is particularly useful at ultra-high frequencies and which can be tuned rapidly through very high frequencies down to high frequencies. The embodiment has a mass 39 of high permeability material in the form of an open-ended tube into which a looped wire 40 is turned by means of a cable 41 which passes over a pulley 42 and is wound on to and off a drum 43. The drum 43 also accommodates a wire 40. Connections are made in the wire 40 as indicated in Figure 6. The connection between the cable 41 and the wire 40 must of course be non-conductive. Starting with the inductance and capacitance of a very small loop of wire, both forms of reactance rapidly increase as the loop is drawn into the mass 39. Provision may be made for an even more rapid increase in the capacitance by the inclusion of grounded conductors in the area adjacent the loop. Band or channel switching is done by the addition of a commutator on drum 43 or other switching device to connect one after another of a series of capacitors into the circuit and/or to switch coils in series connection with the loop.

Figure 7 shows a tapped inductance 44 tuning over a number of wave bands. Coupled for movement with a switching contact 45 is a dust core 46 with a tip 47 of brass. Such an arrangement has a tuning characteristic illustrated graphically in Figure 8. The switching contact and the core are so synchronized for movement that in the case of coils 48, 49 and 50 they are at the electrical bottom of the inductance and their bottoms are grounded when the brass tip is completely in the coil and the dust core is out. In each case this represents the position of highest frequency for the series of coils. A drop in frequency occurs with advancement of the core as shown in Figure 8. By suitable positioning of further coils 51, 52 and 53 and their switch segments tuning is then reversed and these coils are tuned with an upward sweep utilizing only the brass tip 47. Coils 48, 49 and 50 are not tuned by brass tip 47 since the latter is already inside the coil when brought into use by contact 45. This is not so with coils 51, 52 and 53 and the latter coils are switched out before dust core 46 becomes effective.

A non-magnetic tuning core may have an inductive effect and/or a capacitive effect. Arrangements can be made for grounding such a core during part or all of the tuning range. As is well known a grounding connection offers an impedance which rises with frequency. Advantage may be taken of this fact for example by mounting a non-magnetic core on a fairly long supporting grounded conductor. The core will have a primarily capacitive effect in relation to lower frequency bands, but on approaching VHF bands the length of the arm may present such an impedance that the core has primarily an eddy-current inductance-decreasing effect which may be enhanced by the use of a VHF coke.

Applications such as for TV only, or TV and FM, might utilize tuning cores entirely non-magnetic. In the embodiments described in this specification variation of inductance also results from variation of the effective length of a coil. In some cases the length may be increased as movement relative to a core also increases inductance while in other cases the effects will be opposite. This will be most important at the highest frequencies. Tuning effects may also be derived from variation of the reactance reflected into a resonant circuit by a component such as a vacuum tube. For example, a reactance tube could be used with a potentiometer to vary a grid voltage and so obtain the desired reactance variation, and, of course, automatic frequency control may be used in any of the embodiments to correct for errors in tuning.

All of the embodiments involve the principle of ganged units in connection with the tuning section.

I claim:

1. A combined television-radio receiver comprising in combination a manually operable multi-movement control member, a tuning section comprising a series of inductances covering the frequency range of the receiver, a contact segment for each inductance, contact segment engaging means secured to said control member for operation thereby on movement thereof of one type only, a core member comprising magnetic and non-magnetic conducting portions coupled to said contact segment engaging means for synchronous movement therewith, said core member tuning some of said inductances with said magnetic portion only and the remainder of said inductances by said non-magnetic conductive portion only, a television section receiving signals from said tuning section, a radio section receiving signals from said tuning section, a control section coupled to said control member and responsive to said one type of movement, switches in said control section for energising and de-energising said television and radio sections in dependence upon the setting of said tuning section, a circuit control element, and a coupling between said element and said control member responsive to a different type of movement thereof only.

2. A combined television-radio receiver comprising in combination a tuning section having a manually operable rotatable and longitudinally movable control member, a plurality of tuning coils covering the entire frequency range of the receiver, contact strips secured to said coils, contact strip engaging means coupled to said control member for longitudinal movement therewith relative to said contact strips, a tuning core coupled to said contact strip engaging means for synchronous movement therewith for tuning said coils, a television section receiving signals from said tuning section, a radio section receiving signals from said tuning section, a control section coupled to said control member and responsive to said one type of movement, switches in said control section for energising and de-energising said television and radio sections in dependence upon the setting of said tuning section, a circuit control element, and a coupling between said element and said control member for transmitting to said element rotational movement only of said control member.

References Cited in the file of this patent

UNITED STATES PATENTS

| | | |
|---|---|---|
| 1,872,380 | Woods | Aug. 16, 1932 |
| 1,912,140 | Hough | May 30, 1933 |
| 1,965,515 | Schaeffer | July 3, 1934 |
| 1,990,072 | Hagen | Feb. 5, 1935 |
| 1,999,359 | Hopkins | Apr. 30, 1935 |
| 2,141,756 | Linsell | Dec. 27, 1938 |
| 2,513,392 | Aust | July 4, 1950 |
| 2,584,176 | Wingert | Feb. 5, 1952 |
| 2,771,547 | Bell | Nov. 20, 1956 |
| 2,772,355 | Deutsch | Nov. 27, 1956 |
| 2,867,765 | Klettke et al. | Jan. 6, 1959 |